(12) United States Patent
Jhawar

(10) Patent No.: US 7,734,703 B2
(45) Date of Patent: Jun. 8, 2010

(54) REAL-TIME DETECTION AND PREVENTION OF BULK MESSAGES

(75) Inventor: Amit Jhawar, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 985 days.

(21) Appl. No.: 11/458,342

(22) Filed: Jul. 18, 2006

(65) Prior Publication Data

US 2008/0021961 A1     Jan. 24, 2008

(51) Int. Cl.
| | |
|---|---|
| G06F 15/16 | (2006.01) |
| G06F 9/44 | (2006.01) |
| G06F 9/46 | (2006.01) |
| G06F 3/00 | (2006.01) |
| G06F 13/00 | (2006.01) |
| G06Q 30/00 | (2006.01) |
| G07G 1/14 | (2006.01) |

(52) U.S. Cl. .................. 709/206; 709/203; 709/207; 719/315

(58) Field of Classification Search .......... 709/203, 709/206, 207, 219, 230, 236; 719/315; 705/14
See application file for complete search history.

(56) References Cited

U.S. PATENT DOCUMENTS

| | | | | |
|---|---|---|---|---|
| 5,781,901 | A * | 7/1998 | Kuzma | 707/10 |
| 6,018,761 | A * | 1/2000 | Uomini | 709/206 |
| 6,052,709 | A | 4/2000 | Paul | |
| 6,092,101 | A * | 7/2000 | Birrell et al. | 709/206 |
| 6,185,551 | B1 * | 2/2001 | Birrell et al. | 707/3 |
| 6,189,026 | B1 * | 2/2001 | Birrell et al. | 709/206 |
| 6,356,935 | B1 * | 3/2002 | Gibbs | 709/206 |
| 6,571,290 | B2 * | 5/2003 | Selgas et al. | 709/228 |
| 6,615,242 | B1 * | 9/2003 | Riemers | 709/206 |

(Continued)

FOREIGN PATENT DOCUMENTS

KR     20020063534     8/2002

OTHER PUBLICATIONS

"Advance Spam Defense for Messaging and Collaboration Systems," Technical Overview, Sybari, a Microsoft Subsidiary, (15 pages), http://www.sybari.com/_Rainbow/Documents/WP_ASD.pdf [last accessed Nov. 15, 2008].

(Continued)

*Primary Examiner*—Vivek Srivastava
*Assistant Examiner*—Melvin H Pollack
(74) *Attorney, Agent, or Firm*—Perkins Coie LLP

(57) ABSTRACT

A method and system for detecting and preventing bulk messages in real-time is provided. A detection server detects and prevents bulk messages in real-time by analyzing the network traffic pattern of attributes of messages, such as email messages, that are passing through the network against an expected network traffic pattern. The expected network traffic pattern may be specified as a combination of a rate and one or more thresholds, where each threshold has a corresponding status. The rate specifies a quantity of an attribute measured with respect to a quantity of time. A status associated with a threshold is attained when the rate is exceeded the requisite threshold number of times. The status indicates an action that is to be taken in processing the email message containing the attribute. An email message can then be processed in accordance with a status assigned to an attribute of the email message.

20 Claims, 10 Drawing Sheets

U.S. PATENT DOCUMENTS

| | | | |
|---|---|---|---|
| 6,643,686 B1 | 11/2003 | Hall | |
| 6,654,787 B1 * | 11/2003 | Aronson et al. | 709/206 |
| 6,769,016 B2 * | 7/2004 | Rothwell et al. | 709/206 |
| 6,772,196 B1 * | 8/2004 | Kirsch et al. | 709/206 |
| 6,779,021 B1 * | 8/2004 | Bates et al. | 709/206 |
| 6,829,607 B1 * | 12/2004 | Tafoya et al. | 1/1 |
| 6,868,498 B1 * | 3/2005 | Katsikas | 726/14 |
| 6,928,465 B2 | 8/2005 | Earnest | |
| 6,941,304 B2 * | 9/2005 | Gainey et al. | 1/1 |
| 7,007,068 B2 * | 2/2006 | Morkel | 709/206 |
| 7,016,939 B1 * | 3/2006 | Rothwell et al. | 709/206 |
| 7,092,992 B1 * | 8/2006 | Yu | 709/206 |
| 7,117,246 B2 * | 10/2006 | Christenson et al. | 709/206 |
| 7,149,778 B1 * | 12/2006 | Patel et al. | 709/206 |
| 7,200,636 B2 * | 4/2007 | Harding | 709/206 |
| 7,249,175 B1 * | 7/2007 | Donaldson | 709/225 |
| 7,257,564 B2 * | 8/2007 | Loughmiller et al. | 706/16 |
| 7,277,695 B2 * | 10/2007 | Petry et al. | 455/414.1 |
| 7,321,922 B2 * | 1/2008 | Zheng et al. | 709/206 |
| 7,325,249 B2 * | 1/2008 | Sutton et al. | 726/13 |
| 7,412,462 B2 * | 8/2008 | Margolus et al. | 1/1 |
| 7,415,504 B2 * | 8/2008 | Schiavone et al. | 709/207 |
| 7,433,924 B2 * | 10/2008 | Malcolm | 709/206 |
| 7,454,470 B1 * | 11/2008 | Isaacs et al. | 709/206 |
| 7,472,163 B1 * | 12/2008 | Ben-Yoseph et al. | 709/206 |
| 2002/0107925 A1 * | 8/2002 | Goldschneider et al. | 709/206 |
| 2002/0120600 A1 * | 8/2002 | Schiavone et al. | 707/1 |
| 2002/0174185 A1 * | 11/2002 | Rawat et al. | 709/206 |
| 2002/0199095 A1 | 12/2002 | Bandini et al. | |
| 2003/0149726 A1 | 8/2003 | Spear | |
| 2004/0064515 A1 | 4/2004 | Hockey | |
| 2004/0093384 A1 | 5/2004 | Shipp | |
| 2005/0120019 A1 | 6/2005 | Rigoutsos et al. | |
| 2005/0132069 A1 | 6/2005 | Shannon et al. | |
| 2005/0262209 A1 | 11/2005 | Yu | |
| 2006/0031306 A1 | 2/2006 | Haverkos | |
| 2006/0095524 A1 | 5/2006 | Kay et al. | |
| 2006/0212520 A1 * | 9/2006 | Logue et al. | 709/206 |
| 2007/0100949 A1 * | 5/2007 | Hulten et al. | 709/206 |
| 2007/0208853 A1 * | 9/2007 | Yang | 709/225 |
| 2007/0299916 A1 * | 12/2007 | Bates et al. | 709/206 |

OTHER PUBLICATIONS

"BT Infonet SPAM and Virus Protection Service", ©2005, Infonet Computer Services Corporation, Sep. 2004, (4 pages).

"Stop Spam Attacks in Real Time," WatchGuard spamBlocker, WatchGuard Firebox, ©2005 WatchGuard Technologies, Inc., (2 pages).

Cook, Duncan et al., "Catching Spam Before it Arrives: Domain Specific Dynamic Blacklists," ©2006 Australian Computer Society, Inc., (10 pages) http://crpit.com/confpapers/CRPITV54Cook.pdf [last accessed Nov. 15, 2008].

Levitt, Mark and Brian E. Burke, "Choosing the Best Technology to Fight Spam," IDC White Paper, Apr. 2004, ©2004 IDC , (12 pages).

PCT International Search Report, International Application No. PCT/US2007/016374, Applicant: Microsoft Corporation, Mailing Date Jan. 15, 2008, (3 pages).

* cited by examiner

Key Table 302

| Key 306 | Rate 308 | Hit Count 310 | Number of Times Rate Exceeded Locally 312 | Number of Times Rate Exceeded Globally 314 | Status 316 | Status Override 318 |
|---|---|---|---|---|---|---|
|  |  |  |  |  |  |  |
|  |  |  |  |  |  |  |
|  |  |  |  |  |  |  |
|  |  |  |  |  |  |  |
|  |  |  |  |  |  |  |

...

Status Threshold Table 304

| Status 320 | Threshold Value 322 |
|---|---|
| IGNORE | 0 |
| SCORE | 1 |
| HOLD | 5 |
| REJECT | 10 |

*FIG. 3*

REAL-TIME DETECTION AND PREVENTION OF BULK MESSAGES

BACKGROUND

The costs associated with sending and receiving electronic messages, such as email messages, have reduced significantly to a point where the marginal cost of sending or receiving such a message is nearly zero. Commercial and other entities are thus able to send millions of email messages without incurring significant costs. However, the increased reliance on email has exposed the individuals and corporations that use email to threats from, for example, email viruses, spam, phishing attacks, and the like. Commercially available anti-virus software packages are typically employed to combat such attacks.

Anti-virus software typically employ filtration techniques to protect computers against viruses, worms, Trojan horses, and other unwanted messages. Filtration techniques classify an incoming message based on one or more rules that are applied to various attributes of the message. By way of example, a rule may indicate that an incoming message that contains a specific sender's electronic mail address is to be classified and treated as spam. End users, such as a recipient of messages, may also create and use rules to classify incoming messages to identify and handle spam appropriately. As an example, a user of an electronic mail client program may set up an "inbox rule" to move all incoming messages with a subject heading including the text "$$$" to a "deleted items" folder. One problem with filtration techniques is that commercial senders of messages (e.g., "spammers") can adapt their messages to known or commonly employed filters to ensure that messages are not classified as spam. As a result, the filtration techniques react to existing or known attacks, and the filtration techniques may require a tremendous amount of manual intervention to keep up with the adaptations of the spammers. Any kind of manual intervention to react to an attack may be too late as a very large number of unwanted messages may have been processed as a result of the attack, causing additional burden on various resources—e.g., CPU, storage, network bandwidth, etc.

SUMMARY

A method and system for detecting and preventing bulk messages in real-time is provided. A detection server detects and prevents bulk messages in real-time by analyzing the network traffic pattern of attributes of messages, such as electronic mail (email) messages, that are passing through the network against an expected network traffic pattern. The expected network traffic pattern may be specified as a combination of a rate and one or more thresholds, where each threshold has a corresponding status. The rate specifies a quantity of the attribute measured with respect to a quantity of time. A threshold specifies a number of times the specified rate needs to be exceeded, and a status associated with a threshold is attained when the rate is exceeded the requisite threshold number of times. The status indicates an action that is to be taken in processing the email message containing the attribute. Upon receiving an indication of an attribute of an email message, the detection server checks to determine whether the indicated instance of the attribute of the email message causes the specified rate to be exceeded and a specified threshold to be crossed. Whenever an indicated instance of the attribute of the email message causes a specified threshold to be crossed, the detection server assigns to the attribute the status associated with the threshold. The email message can then be processed in accordance with the status assigned to the attribute of the email message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a data structure diagram that illustrates example logical data structures of the detection server, according to some embodiments.

DETAILED DESCRIPTION

Figure 1:
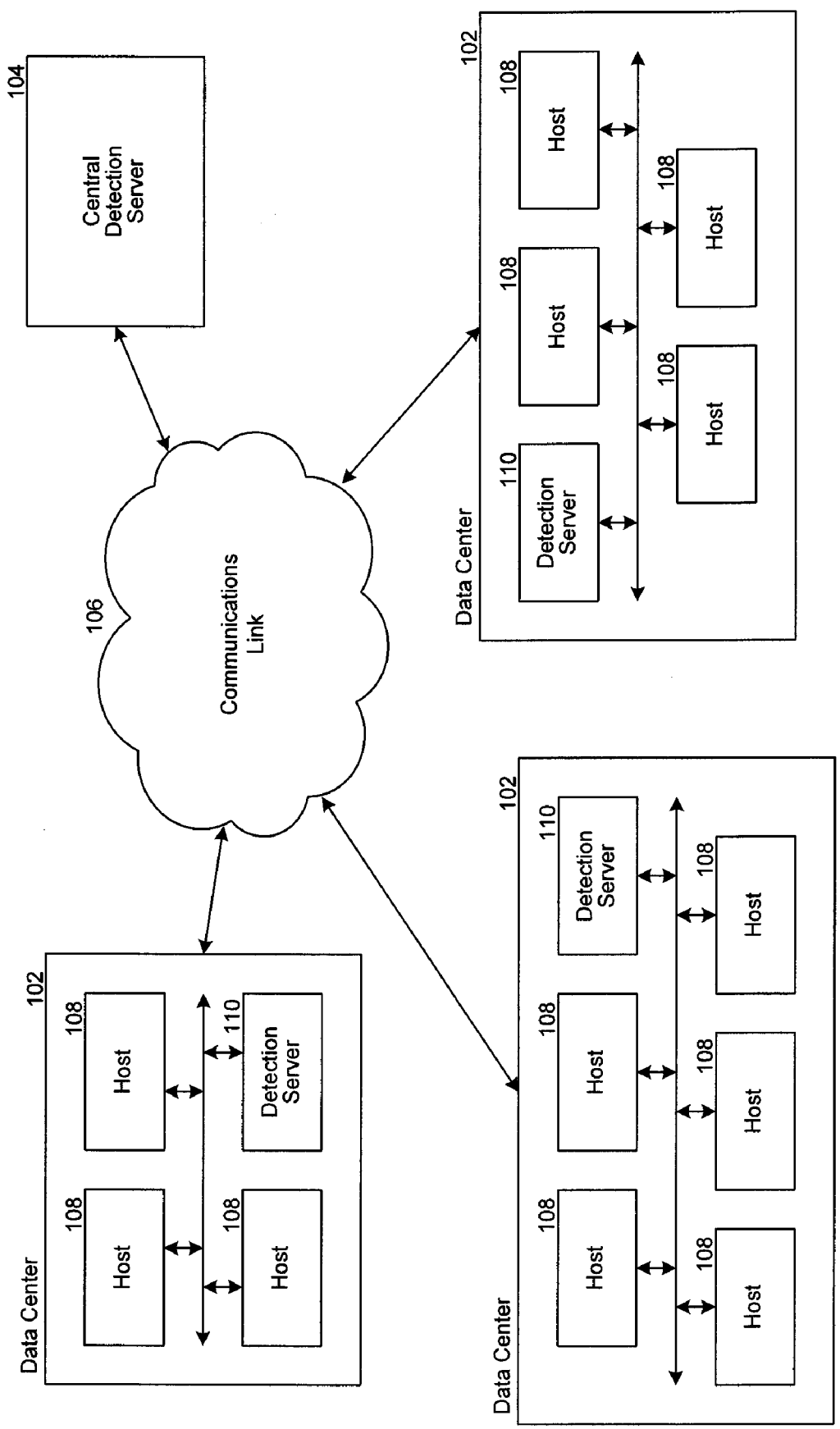
FIG. 1 is a high-level block diagram that illustrates an environment in which a detection server executes, according to some embodiments.

A method and system for detecting and preventing bulk messages in real-time is provided. In some embodiments, a detection server detects and prevents bulk messages in real-time by analyzing the network traffic pattern of attributes of messages, such as electronic mail (email) messages, that are passing through the network against an expected network traffic pattern. An attribute of an email message may be the sender's Internet Protocol (IP) address, a body part (e.g., text, HTML, image, document, etc.) of the email message, and the like. An authorized user, such as a network or system administrator, may specify an expected network traffic pattern for the attributes of email messages. For example, attacks from undesirable bulk messages, such as email attacks, can be broadly categorized as (1) a single IP address hitting the network with either the same or similar message or potentially different messages, or (2) the same or similar message coming from multiple locations, which may be a virus attack. The characteristics of the undesirable messages create a certain, distinctive undesirable network traffic pattern, and the user can specify an expected network traffic pattern that accounts for the undesirable network traffic pattern. The expected network traffic pattern may be specified as a combination of a rate and one or more thresholds, where each threshold has a corresponding status. The rate specifies a quantity of the attribute measured with respect to a quantity of time. For example, a rate may be specified as a number of instances of an attribute (e.g., ten instances of the attribute) detected within a specified period of time (e.g., one second). A threshold specifies a number of times the specified rate needs to be exceeded, and a status associated with a threshold is attained when the rate is exceeded the requisite threshold number of times. The status indicates an action that is to be taken in processing the email message containing the attribute. In a typical scenario, the detection server receives an indication of an attribute of an email message from a message delivery host. Upon receiving the indication of the attribute of the email message, the detection server checks to determine whether the indicated instance of the attribute of the email message causes the specified rate to be exceeded and a specified threshold to be crossed. Whenever an indicated instance of the attribute of the email message causes a specified threshold to be crossed, the detection server assigns to the attribute the status associated with the threshold. The detection server provides to the message delivery host the current status assigned to the attribute, and the message delivery host processes the email message in accordance with the specified status. In this manner, based on the specified rate and thresholds (i.e., the expected network pattern), the detection server is able to monitor the attributes of the email messages that are flowing through the network, and automatically take action in real-time, without any human intervention, whenever a threshold is crossed, thus indicating a potential anomaly in the network traffic pattern.

In some embodiments, the detection servers apply a single rate to all attributes. In other embodiments, the detection servers may apply multiple rates to the attributes. For example, the detection server may apply one rate to one attribute and a second rate to a multiple number of different attributes.

In some embodiments, a message delivery host may generate one or more keys from various attributes of an email message, and send each key to the detection server along with a request for the status associated with each key. A key is a representation, such as a hash value, of an attribute of an email message, and the message delivery host may use any of a variety of well-known hashing functions or techniques to generate the keys from the attributes of the email message. For example, when processing an email message, the message delivery host may generate a hash value of the IP address of the sender of the email message, and hash values of the contents of various parts of the email message body. The message delivery host then sends each of the generated keys to the detection server and, without delivering or otherwise further processing the email message, waits to receive from the detection server the status associated with each of the keys. The message delivery host then processes the email message according to the respective statuses of the keys received from the detection server.

By way of example, a status may specify an action such as accept, reject, hold, score, or ignore, and each of the keys of an email message may be associated with the same status or different statuses. Stated another way, the keys of an email message need not all be associated with the same status. Upon receiving the statuses associated with the keys, the message delivery host may apply a priority scheme (precedence order) to the received statuses to determine how to process the email message. For example, the precedence order of the statuses, form high priority to low priority, may be to accept, reject, hold, score, and ignore. Applying this precedence order, the message delivery host accepts the email message (e.g., normally processes the email message) if any key of the email message is associated with a status of accept, irrespective of the statuses of the other keys of the email message. If no key of the email message is associated with a status of accept, and any key of the email message is associated with a status of reject, then the message delivery host rejects the email message (e.g., does not further process the email message). If no key of the email message is associated with a status of accept or reject, and any key of the email message is associated with a status of hold, then the message delivery host sends a copy of the email message to a preconfigured address. The message delivery host can indicate that a copy of the email message has been retained for further examination, and continue processing the email message. If no key of the email message is associated with a status of accept, reject, or hold, and any key of the email message is associated with a status of score, then the message delivery host makes an indication that the email message may be suspicious, and accepts the email message (e.g., processes the email message with the indication that it may be suspicious). The message delivery host may identify the attribute of the email message that may have been suspicious. If no key of the email message is associated with a status of accept, reject, hold, or score, or all of the keys are associated with status of ignore, then the message delivery host accepts the email message. Using the statuses associated with the keys, the detection server is able to indicate the keys that may be suspicious and specify the action to be taken by the message delivery host. For example, the statuses reject, hold, and score indicate varying levels of suspiciousness of the key (i.e., the suspiciousness of the attribute of the email message that was used to generate the key) and, of these, the status reject indicates a confirmed bad key, while the status of accept serves as an "override" action. The aforementioned number of statuses are only one example of indicating varying levels of suspiciousness and the corresponding actions to perform at each level, and one skilled in the art will appreciate that there may be a different number of levels and/or different actions to perform at each level. In some embodiments, the message delivery host may send the rejected email messages to a preconfigured address for further analysis by, for example, a spam analyst.

In some embodiments, the message delivery host waits for a preconfigured "timeout" time period to receive a reply to the request for status associated with a key from the detection server. The preconfigured timeout may be specified in a configuration file. If the message delivery host does not receive a reply from the detection server within the timeout time period, the message delivery host "skips" the key and continues processing the next key. In this case, the message delivery host can process the key as if the detection server returned a status of ignore for the key.

In some embodiments, the detection server advertises suspicious keys (e.g., a keys associated with statuses of reject, hold, or score) to its peer detection servers. By way of example, an organization's computing environment, including its services (e.g., email services, web services, etc.) and network, may be distributed into a multiple number of datacenters. For example, one datacenter may be servicing the organization's facilities located in North America, another datacenter may be servicing the organization's facilities located in Europe, and still another datacenter may be servicing the organization's facilities located in Asia. Each datacenter may be implemented using a multiple number of servers, such as the message delivery hosts, and the servers in a datacenter may be supported by a detection server. When a detection server in one datacenter identifies a key to be suspicious, the detection server advertises the suspicious key to its peer detection servers in the other datacenters by broadcasting the key. The detection server may also broadcast information regarding the suspicious key, such as an indication of the number of times the rate has been exceeded in the particular datacenter. When a detection server receives an advertisement of a suspicious key or keys form a peer detection server, the receiving detection server consolidates the received information regarding the suspicious key(s) with its own network traffic pattern information (e.g., the information regarding the keys detected in the receiving detection server's datacenter) to generate a more complete view of the distributed datacenters. For example, a key may be determined to be suspicious in a first datacenter and not in a second peer datacenter. In this instance, the detection server in the first datacenter advertises the suspicious key to its peer detection server in the second datacenter. Upon receiving the advertisement of the suspicious key, the detection server in the second datacenter can also identify the key received through the advertisement, which was not previously determined to be suspicious in the second datacenter, as a suspicious key in the second datacenter. In another example, a key may have been detected in both datacenters to be suspicious (e.g., status of score), but not as a confirmed bad key (e.g., status of reject). In this instance, the detection server in the first datacenter advertises the suspicious key to its peer detection server in the second datacenter and, likewise, the detection server in the second datacenter advertises the suspicious key to its peer detection server in the first datacenter. Upon receiving the advertisement of the suspicious key, the detection server in each datacenter consolidates the information regarding the suspicious key received via the advertisement with its own information and updates the status associated with the suspicious key accordingly. For example, the consolidated information may be sufficient to indicate that the suspicious key should now be a confirmed bad key (i.e., associate a status of reject to the suspicious key) even though the suspicious key was not identified as a confirmed bad key in either of the datacenters. The sharing of information between peer detection servers allows the detection servers to consolidate the information regarding the distributed datacenters in real-time, automatically generate a consolidated view of the network traffic patterns, and create a more complete view of the network.

In some embodiments, a central detection server periodically pulls information regarding all the keys from the detections servers. The central detection server then processes the pulled information to identify the suspicious keys, and pushes (e.g., redistributes) the information regarding the suspicious keys, including the confirmed bad keys, to the detection servers. Upon receiving the information regarding the suspicious keys and the confirmed bad keys, each detection server can consolidate the received information and use the consolidated information in its processing of the requests for status associated with a key.

In some embodiments, the central detection server allows authorized users, such as system administrators, network administrators, spam analysts, and the like, to input keys into the central server for distribution to the detection servers. The central detection server may provide a user interface (UI) for use in inputting a key or multiple keys. By way of example, a spam analyst may receive a confirmed bad key from a source, such as an anti-virus software provider. The analyst can then utilize the UI provided by the central detection server to input the confirmed bad key for distribution to the detection servers. Upon receiving the confirmed bad key from the central detection server, each detection server uses the received information regarding the confirmed bad key in its processing of the requests for status associated with a key. In some embodiments, the central detection server provides authorized users access to the keys, and the information related to the keys, and allows the users to input a different status for a key or multiple keys. When a user inputs a status for a key, the central detection server distributes the indicated status and the key to the detection servers for use by the detection servers in their processing of the requests for status associated with a key. By way of example, a spam analyst may analyze a suspicious key and determine that the key is not suspicious. The analyst can then input a new status that indicates that the previously suspicious key is now a good key (e.g., the analyst can assign a new status of either accept or ignore to the previously suspicious key).

FIG. 1 is a high-level block diagram that illustrates an environment in which a detection server executes, according to some embodiments. The environment comprises a plurality of datacenters 102 coupled to a central detection server 104 via a communications link 106. The environment is only one example of a suitable operating environment and is not intended to suggest any limitation as to the scope of use or functionality of the detection servers and the central detection server. The datacenters may each correspond to a centralized repository, either physical or virtual, of computing services. Each datacenter comprises a plurality of message delivery hosts 108 coupled to a detection server 110. The hosts in the datacenter provide the computing services of the datacenter. For example, one or more hosts in the datacenter may be email delivery hosts that provide email services to, for example, an organization. Other hosts may provide services such as web services, web content, various application services, and the like. Each detection server services the hosts that are in its datacenter. When a host in a datacenter receives a message to process, the host generates keys from various parts of the message and sends each key, along with a request for its status, to the detection server that is servicing the datacenter. The detection server monitors the traffic pattern of the keys that are passing through the network, and assigns a status to each key based on the monitored traffic pattern. Upon receiving the keys, the detection server looks up the statuses assigned to the keys and returns the statuses to the host. The host then processes the message according to the statuses provided by the detection server. The central detection server interacts with the detection servers in the various datacenters to generate and provide a global view of the datacenters.

Figure 2:
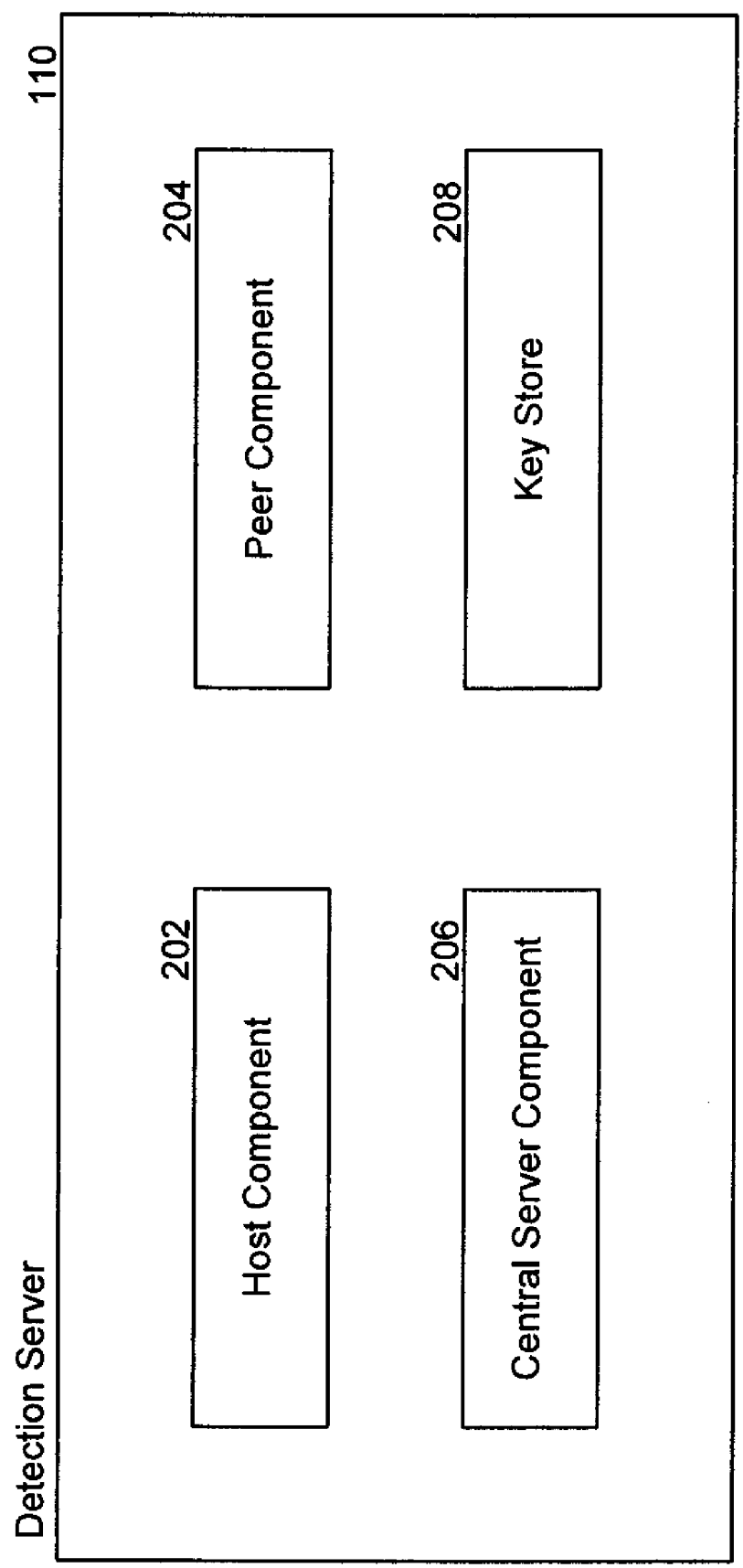
FIG. 2 is a block diagram that illustrates selected components of the detection server, according to some embodiments.

FIG. 2 is a block diagram that illustrates selected components of the detection server, according to some embodiments. The detection server comprises a host component 202, a peer component 204, a central server component 206, and a key store 208. The key store contains the keys received from the hosts and the central detection server and other data structures used by the detection server. The host component is invoked when a request for a status of a key received from a host. The host component processes and responds to the received requests for statuses of keys received from the hosts. The peer component is invoked to process interactions with peer detection servers. The central server component is invoked to process interactions with the central detection server.

The computing device on which the detection server is implemented may include a central processing unit, memory, input devices (e.g., keyboard and pointing devices), output devices (e.g., display devices), and storage devices (e.g., disk drives). The memory and storage devices are computer-readable media that may contain instructions that implement the detection server. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the detection server and the central detection server may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The detection server and the central detection server may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 3 is a data structure diagram that illustrates example logical data structures of the detection server, according to some embodiments. The data structures include a key table 302 and a status threshold table 304. The key table includes an entry for each key that is monitored by the detection server. Whenever the detection server receives an indication of a key from a host, for example, along with a request for a status of the key, the detection server updates the entry in the key table for that key. Each entry in the key table comprises, by way of example, seven fields including a key field 306, a rate field 308, a hit count field 310, a number of times rate exceeded locally field 312, a number of times rate exceeded globally field 314, a status field 316, and a status override field 318. The key field identifies a key. The rate field specifies a rate for the identified key. The hit count field contains a count of the number of times the identified key was detected by the detection server (e.g., processed by the detection server). The number of times rate exceeded locally field contains a count of the number of times the detection server determined that the identified key exceeded the specified rate. The number of times rate exceeded globally field contains a count of the number of times the identified key exceeded the specified rate globally (e.g., across the collection of peer detection servers). For example, the detection server accordingly updates the number of times rate exceeded globally field whenever it receives a count of the number of times other detection servers (e.g., the detection servers in other datacenters) determined that the identified key exceeded the specified rate. This count may be provided by peer detection servers or the central detection server. The status field specifies a status that is associated with the identified key. The hosts use the status assigned to the key to determine how to process the message from which the key was generated. When a status is specified in the status override field, the specified status overrides the status specified in the status field. For example, when a user manually specifies a status for a key, the detection server can record an indication of the manually specified status in the status override field. The status threshold table contains an entry for each status that may be assigned to a key. Each entry in the status threshold table comprises, by way of example, two fields including a status field 320 and a threshold value field 322. The status field identifies a status. The threshold value field specifies a number of times the rate needs to be exceeded for a key to attain the corresponding status. The detection server can create an entry in the status threshold table for each status and its corresponding threshold value specified by an authorized user. By way of example and as illustrated by the status threshold table in FIG. 3, the first entry identifies a status IGNORE and a threshold value of 0, the second entry identifies a status SCORE and a threshold value of 1, the third entry identifies a status HOLD and a threshold value of 5, and the fourth entry identifies a status REJECT and a threshold value of 10. These entries indicate that a key is assigned: a status of IGNORE when the rate is exceeded zero times; a status of SCORE when the rate is exceeded one time; a status of HOLD when the rate is exceeded five times; and a status of REJECT when the rate is exceeded ten times. One skilled in the art will appreciate that this is only one example of the logical layout of data structures of the detection server. For example, rather that specifying the rate in each entry of the key table, the rate may be specified in a separate record or table. The data structures of the detection server may be tailored to the space/computation requirements of the detection server.

Figure 4:
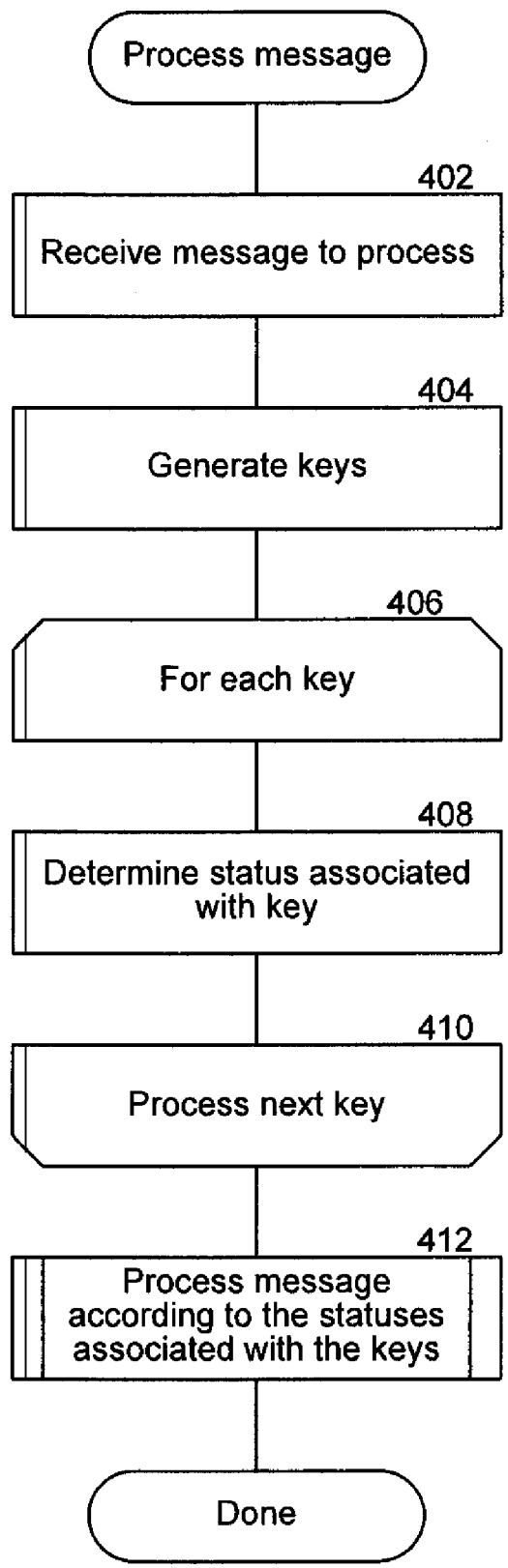
FIG. 4 is a flow diagram that illustrates the processing of a message delivery host, according to some embodiments.

FIG. 4 is a flow diagram that illustrates the processing of a message delivery host, according to some embodiments. The message delivery host processes messages as part of providing its services. For example, an email message delivery host processes email messages as part of providing email services to email clients. In block 402, the message delivery host receives a message to process. In block 404, the message delivery host generates one or more keys from various attributes of the message. For each generated key (block 406), the message delivery host performs block 408, until all of the keys are processed (block 410). In block 408, the message delivery host utilizes the services of its detection server to determine the status associated with (e.g., assigned to) the key. For example, the message delivery host may send each key to the detection server along with a request for status. In block 412, the message delivery host processes the message according to the statuses associated with the keys, and completes.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 5:
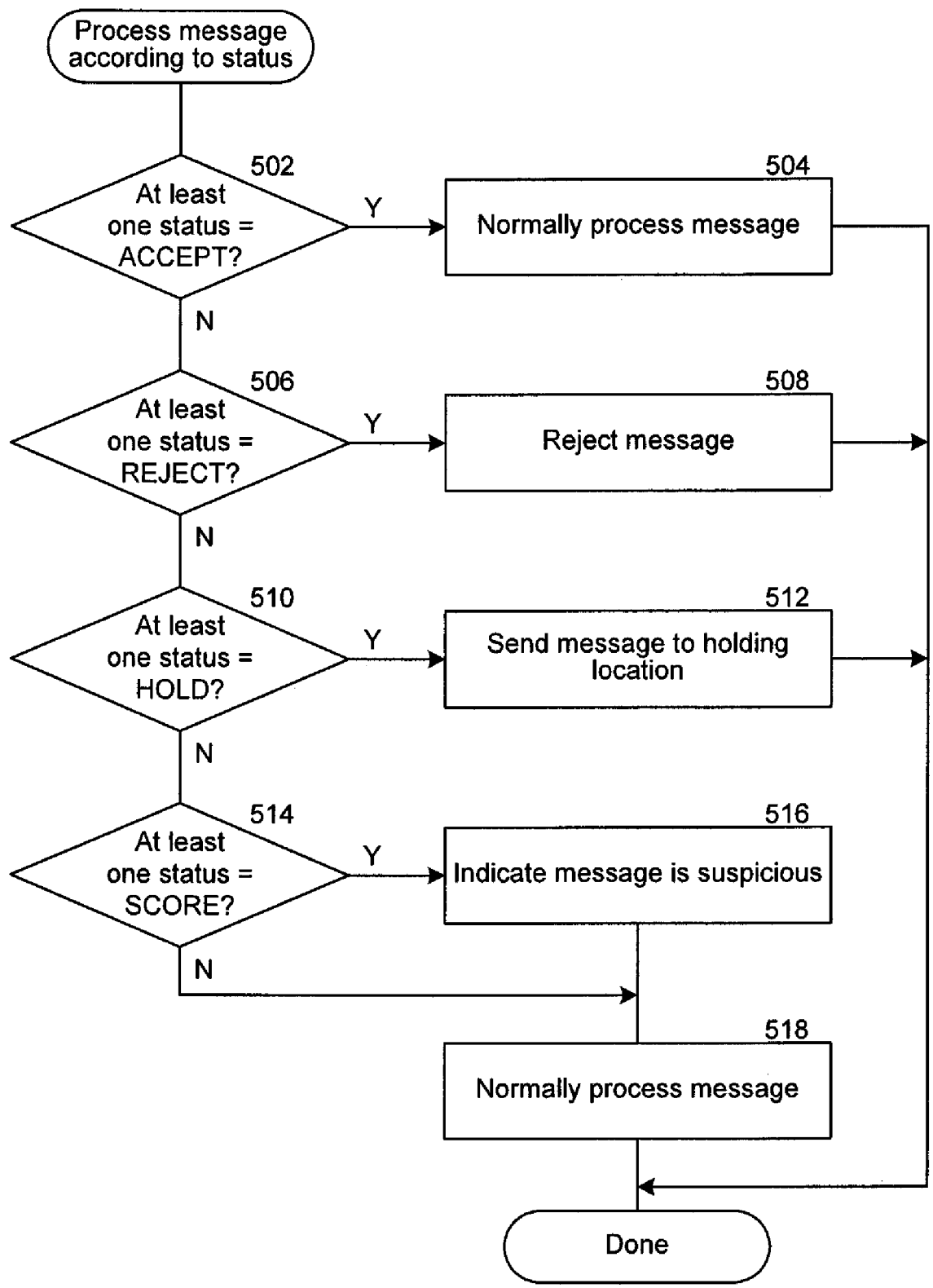
FIG. 5 is a flow diagram that illustrates the processing of the message delivery host to process a message in accordance with the status associated with keys, according to some embodiments.

FIG. 5 is a flow diagram that illustrates the processing of the message delivery host to process a message in accordance with the status associated with keys, according to some embodiments. The message delivery host receives the statuses associated with the keys from the detection server, for example, in response to one or more requests for status made by the message delivery host. In decision block 502, if at least one of the statuses is an ACCEPT status, then the message delivery host continues at block 504, else the message delivery host continues at decision block 506. In block 504, the message delivery host processes the message in a normal manner, and completes. In this instance, the message delivery host processes the message as a good message. In decision block 506, if at least one of the statuses is a REJECT status, then the message delivery host continues at block 508, else the message delivery host continues at decision block 510. In block 508, the message delivery host rejects the message as a bad (e.g., bulk) message, and completes. In this instance, the message delivery host does not further process the message. In decision block 510, if at least one of the statuses is a HOLD status, then the message delivery host continues at block 512, else the message delivery host continues at decision block 514. In block 512, the message delivery host sends a copy of the message to a preconfigured address of a holding location, and completes. This message may then be further analyzed, for example, by spam analysts. In some embodiments, the message delivery host may continue to process the message. In other embodiments, the message delivery host does not further process the message. In decision block 514, if at least one of the statuses is a SCORE status, then the message delivery host continues at block 516, else the message delivery host continues at block 518. In block 516, the message delivery host indicates that the message is suspicious and processes the message in the normal manner (block 518). In block 518, the message delivery host processes the message as a good message in the normal manner, and completes.

Figure 6:
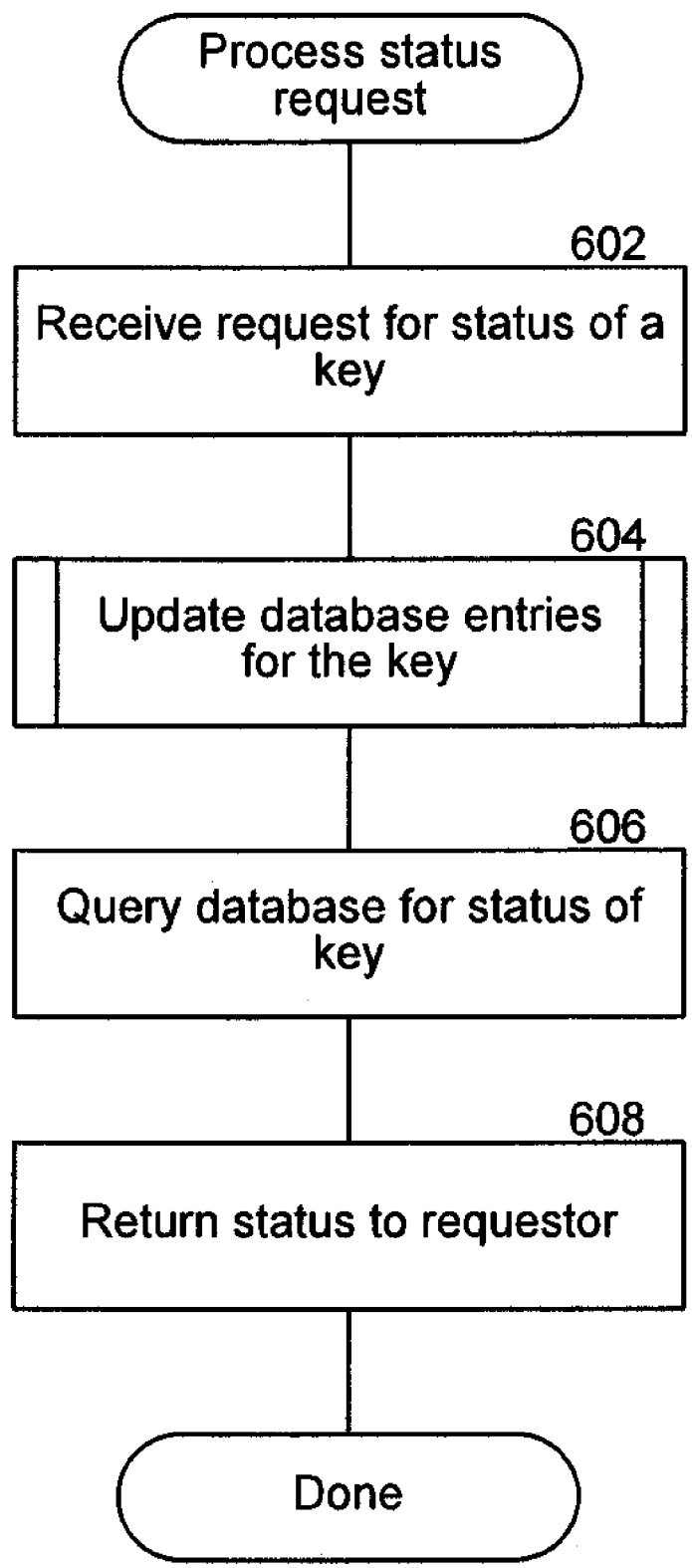
FIG. 6 is a flow diagram that illustrates the processing of the host component of the detection server, according to some embodiments.

FIG. 6 is a flow diagram that illustrates the processing of the host component of the detection server, according to some embodiments. The host component is passed the key received from a host and returns the status associated with the key. In block 602, the host component receives the request for status of a key. In block 604, the host component updates the database entries for the key. In block 606, the host component queries the database for the status of the key. In block 608, the host component returns the status to the requester (e.g., the message delivery host that sent the request for status), and completes.

Figure 7:
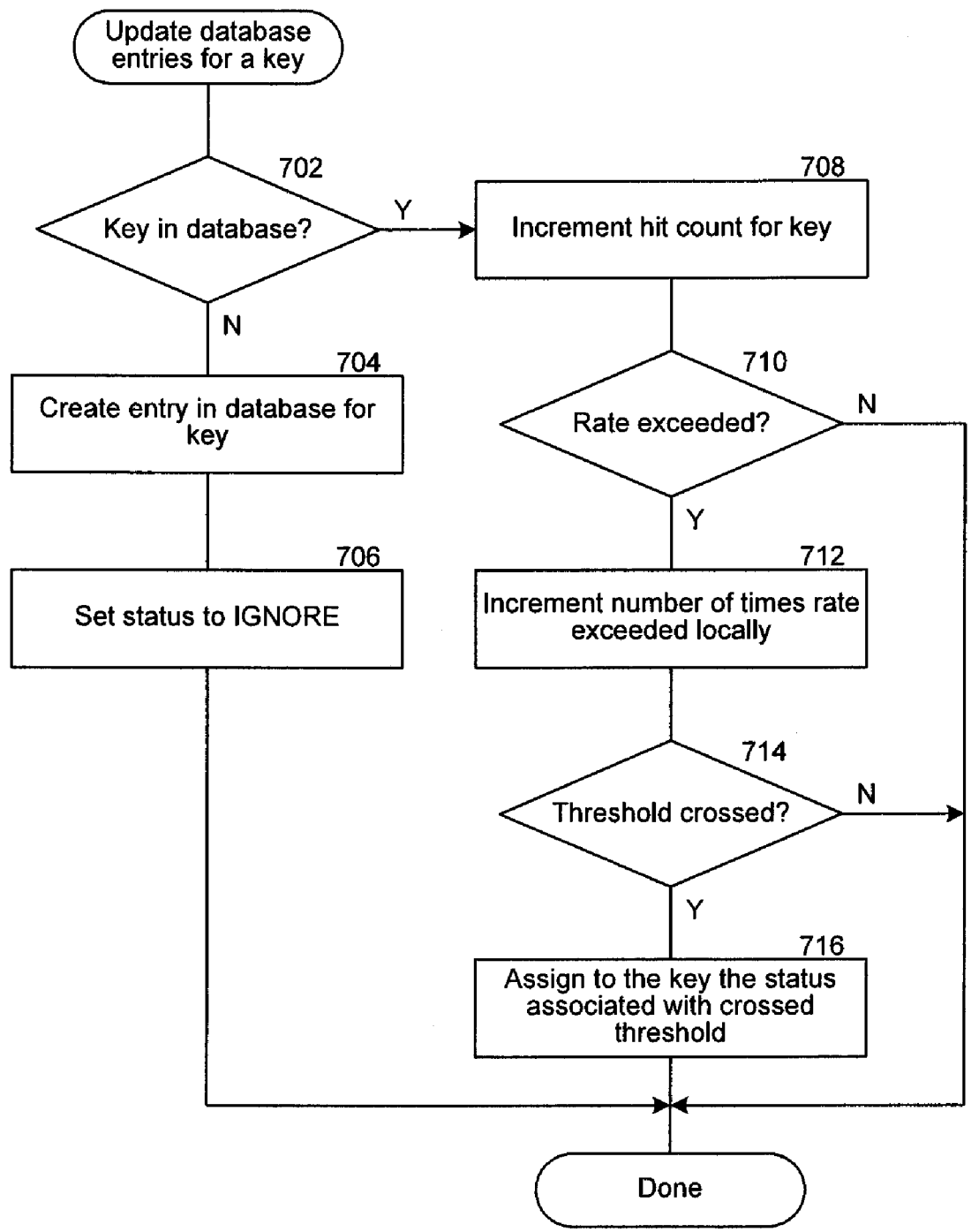
FIG. 7 is a flow diagram that illustrates the processing of the host component of the detection server to update database entries for a key, according to some embodiments.

FIG. 7 is a flow diagram that illustrates the processing of the host component of the detection server to update database entries for a key, according to some embodiments. The host component updates the entries corresponding to the key in the key table or creates a new entry for the key in the key table. In decision block 702, if an entry for the key is not in the database, then the host component continues at block 704, else the host component continues at block 708. In block 704, the host component creates an entry in the key table for the key. In block 706, the host component sets the status of the key to IGNORE, and completes. For example, the host component specifies a status of IGNORE in the status field of the entry for the key in the key table. In block 708, the host component increments the hit count for the key. For example, the host component can increment the hit count maintained in the hit count field of the entry for the key in the key table. In decision block 710, if the increment in the hit count does not cause the rate to be exceeded, then the host component completes, else the host component continues at block 712. In block 712, the host component increments the number of times the rate has been exceeded locally to the detection server. For example, the host component can increment the count maintained in the number of times rate exceeded locally field of the entry for the key in the key table. In decision block 714, if the occurrence of the rate being exceeded does not cause any of the specified thresholds to be crossed, then the host component completes, else the host component continues at block 716. The host component can check the thresholds specified in the status threshold table to determine if any one of the specified thresholds are crossed. In block 716, the host component assigns to the key the status associated with the threshold that was crossed, and completes. Using the status threshold table of FIG. 3 as an example, assuming that the threshold of 5 was crossed, the host component assigns to the key a status of HOLD. The host component can specify a status of HOLD in the status field of the entry for the key in the key table. If the host component determines that the rate is not exceeded (block 710) or that a threshold is not crossed (block 716), the host component does not update the status (e.g., the status field of the entry for the key in the key table) of the key. The host component can periodically clean up entries for keys in the key table.

Figure 8:
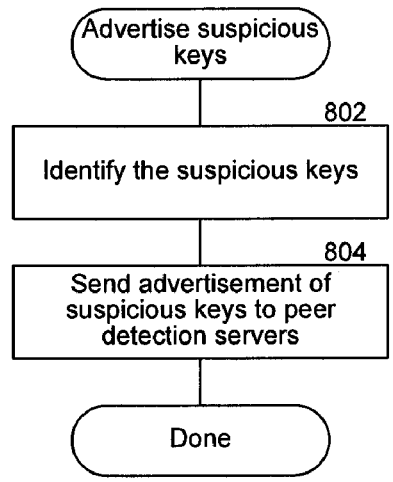
FIG. 8 is a flow diagram that illustrates the processing of the peer component of the detection server to advertise suspicious keys to peer detection servers, according to some embodiments.

FIG. 8 is a flow diagram that illustrates the processing of the peer component of the detection server to advertise suspicious keys to peer detection servers, according to some embodiments. The peer component periodically broadcasts to peer detection servers the keys that have been identified as being suspicious by the detection server. In block 802, the peer component identifies the suspicious keys. For example, the peer component can identify the keys in the key table whose statuses are specified to be either SCORE, HOLD, or REJECT. In block 804, the peer component sends an advertisement of the suspicious keys to the peer detection servers, and completes. For example, the peer component can send a broadcast to the peer detection servers a message that includes an indication of the suspicious keys and data corresponding to each suspicious key, such as, by way of example, the hit count, the number of times the rate was exceeded locally, other statistical information, and the like.

Figure 9:
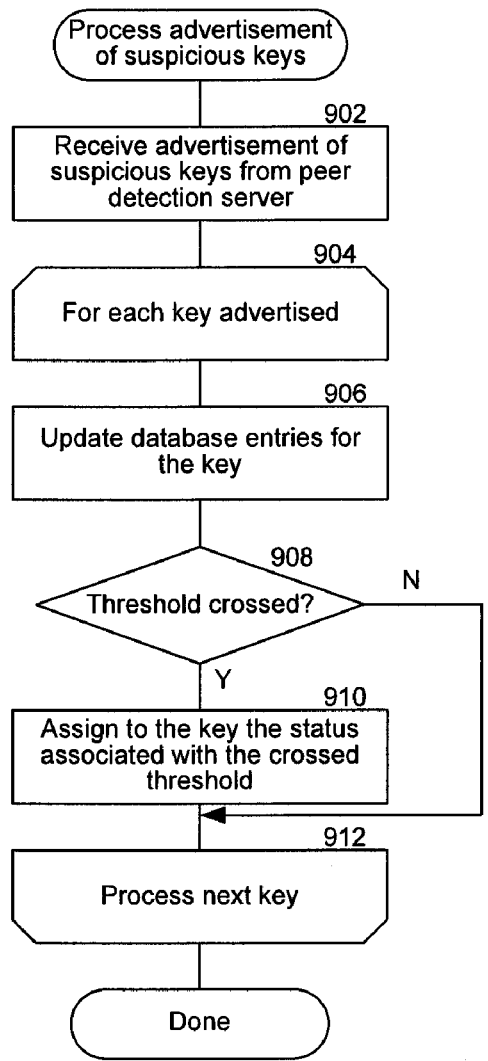
FIG. 9 is a flow diagram that illustrates the processing of the peer component of the detection server to process suspicious keys advertised by peer detection servers, according to some embodiments.

FIG. 9 is a flow diagram that illustrates the processing of the peer component of the detection server to process suspicious keys advertised by peer detection servers, according to some embodiments. The peer component is passed the advertisement of suspicious keys received from a peer detection server. The peer component then updates the entries corresponding to the suspicious keys in the key table or creates new entries for the suspicious keys in the key table. In block 902, the peer component receives an advertisement of suspicious keys from a peer detection server. For each suspicious key advertised (block 904), the peer component performs blocks 906 to 910, until all of the advertised suspicious keys are processed (block 912). In block 906, the peer component updates the database entries for the key with the information regarding the suspicious key received with the advertisement. For example, if an entry for the suspicious key exists in the key table, then the peer component updates the entries corresponding to the suspicious key in the key table with the information regarding the suspicious key received with the advertisement. If an entry for the suspicious key does not exist in the key table, then the peer component creates a new entry for the suspicious key in the key table and updates the entries corresponding to the suspicious key in the key table with the information regarding the suspicious key received with the advertisement. In decision block 908, if the advertised suspicious key and, in particular, the information regarding the suspicious key received with the advertisement causes any of the specified thresholds to be crossed, then the peer component continues at block 910, else the peer component continues at block 912 to process the next advertised key. In block 910, the peer component assigns to the suspicious key the status associated with the threshold that was crossed.

Figure 10:
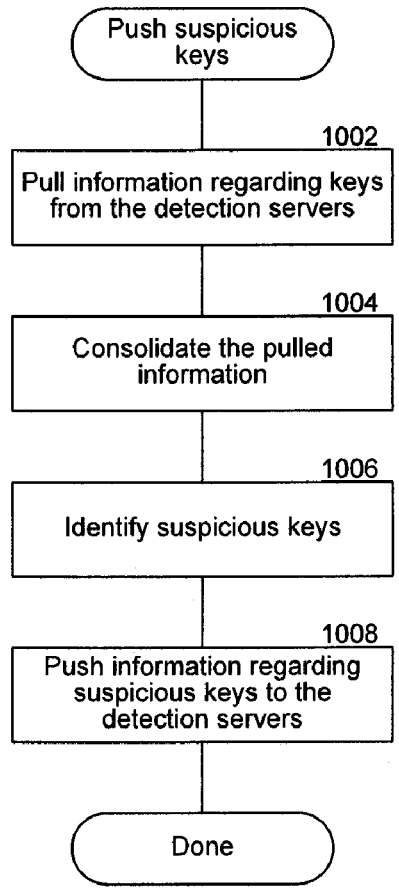
FIG. 10 is a flow diagram that illustrates the processing of the central detection server to push suspicious keys to the detection servers, according to some embodiments.

FIG. 10 is a flow diagram that illustrates the processing of the central detection server to push suspicious keys to the detection servers, according to some embodiments. The central detection server periodically pulls (obtains) information regarding the keys from the detection servers, processes the pulled information to identify suspicious keys, and pushes (distributes) the information regarding the suspicious keys to the detection servers. In block 1002, the central detection server pulls from the detection servers information regarding the keys processed by the detection servers. In block 1004, the central detection server consolidates the information regarding the keys pulled from the detection servers. In block 1006, the central detection server identifies suspicious keys using the consolidated information. In block 1008, the central detection server pushes information regarding the identified suspicious keys to the detection servers, and completes.

Figure 11:
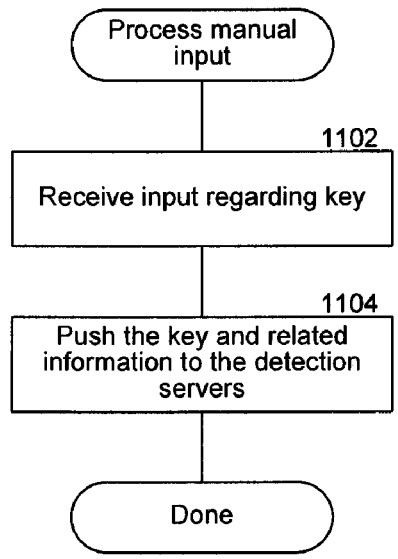
FIG. 11 is a flow diagram that illustrates the processing of the central detection server to push manual input, according to some embodiments.

FIG. 11 is a flow diagram that illustrates the processing of the central detection server to push manual input, according to some embodiments. The central detection server may provide a UI that allows authorized users to view and/or input information regarding keys. The central detection server pushes to the detection servers input provided by the authorized users. In block 1102, the central detection server receives input regarding a key. For example, a spam analyst may input a key, which has not been detected by any of the detection servers) and indicate that the input key is a confirmed bad key (specify for the input key a status of REJECT). In block 1104, the central detection server pushes the input information (the key and related information) to the detection servers, and completes.

Figure 12:
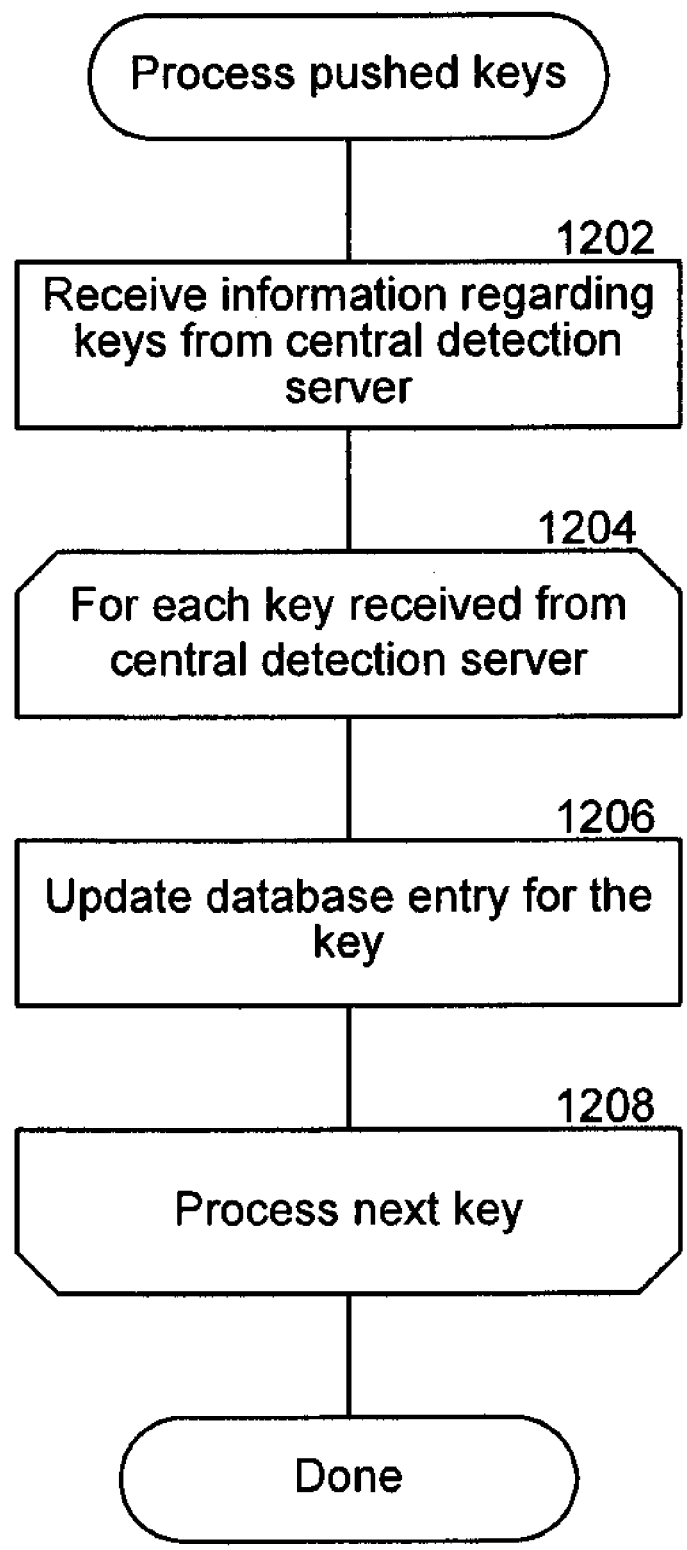
FIG. 12 is a flow diagram that illustrates the processing of the central server component of the detection server to process keys pushed by the central detection server, according to some embodiments.

FIG. 12 is a flow diagram that illustrates the processing of the central server component of the detection server to process keys pushed by the central detection server, according to some embodiments. The central server component receives information regarding keys from the central detection server, and updates the entries corresponding to the received keys in the key table or creates new entries for the received keys in the key table. In block 1202, the central server component receives keys, and information regarding keys, from the central detection server. For each key or information regarding the key received (block 1204), the central server component performs block 1206, until all of the received keys are processed (block 1208). In block 1206, the peer component updates the database entries for the key with the information regarding the key received from the central detection server. If an entry for the key does not exist in the key table, then the peer component creates a new entry for the key in the key table and updates the entries corresponding to the key in the key table with the information regarding the key received from the central detection server. For example, the central server component may have received information which indicates that a currently suspicious key should now be processed as a good, non-suspicious key (e.g., that the status of the suspicious key should be overridden with a status of ACCEPT). In this instance, the central server component specifies a status of ACCEPT in the status override field of the entry for the key in the key table.

From the foregoing, it will be appreciated that specific embodiments of the detection server have been described herein for purposes of illustration, but that various modifications may be made without deviating from the spirit and scope of the invention. Although the detection server was described in the context of detecting bulk or unwanted email messages, one skilled in the art will appreciate that the detection server can detect messages other than email messages. For example, the message delivery hosts may be web servers processing various web messages. In this instance, the message delivery hosts may generate keys from various attributes of a web message and send the generated keys to an appropriate detection server to obtain the statuses of the keys. The detection server can thus detect bulk or unwanted web messages. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer-implemented method for detecting unwanted messages in real-time at a message delivery host, the method comprising:
   providing a plurality of statuses for keys associated with messages, the statuses indicating actions to take with messages and having a precedence order from a high priority to a low priority;
   providing a key store that stores an indication of keys along with a status for each key;
   receiving from a user an indication of a key and its status;
   after receiving the key, storing an indication of the received key and its status in the key store;
   for each of a plurality of attributes of the message, generating a key for the message based on the attribute of the message;
   for each generated key, determining a status associated with the generated key as indicated by the key store; and
   processing the message according to the statuses associated with the generated keys by:
      selecting the status associated with a generated key that has the highest priority; and
      performing the action of the selected status with the message.

2. The method of claim 1, wherein the attribute of the message is an Internet Protocol (IP) address of a sender of the message.

3. The method of claim 1, wherein the attribute of the message is a body part of the message.

4. The method of claim 1, wherein the key is a hash print of a body part of the message.

5. The method of claim 1, wherein the status is obtained from a remote detection server.

6. The method of claim 1, wherein the status indicates to normally process the message.

7. The method of claim 1, wherein the status indicates to reject the message.

8. The method of claim 1, wherein the status indicates to send a copy of the message to a preconfigured address.

9. The method of claim 1, wherein the status indicates to indicate the message as suspicious.

10. The method of claim 1, wherein each status associated with a key is based on a count of a number of times a specified rate is exceeded and at least one threshold value, each threshold value specifies the number of times the rate has to be exceeded for the key to attain the corresponding status.

11. The method of claim 10, wherein the count of a number of times the specified rate is exceeded is a local count.

12. The method of claim 10, wherein the count of a number of times the specified rate is exceeded is a global count.

13. A computer-implemented method for assigning statuses to keys at a detection server, the keys based on attributes of messages, the method comprising:
   providing a rate indicating number of times a key is received within a specified time period;
   for each of a plurality of threshold values, providing an association between the threshold value and a status, wherein each threshold value specifies a number of times the rate has been exceeded;
   for each of a plurality of keys, providing a count of a number of times the rate of receiving the key is exceeded on the detection server;

receiving from a message delivery host an indication of a key;

determining whether the rate of receiving the received key is exceeded; and upon determining that the rate of receiving the received key is exceeded, incrementing the count of the number of times the rate of receiving the received key is exceeded on the detection server;

determining whether the count crosses one of the threshold values; and upon determining that the count crosses one of the threshold values, assigning to the key the status associated with the threshold value that the count crossed.

14. The method of claim 13 further comprising:

for each key, providing a count of a number of times the rate is exceeded globally; and upon determining that the rate is exceeded, updating the count of the number of times the rate is exceeded globally.

15. The method of claim 14 further comprising:

receiving from a peer detection server an advertisement of a suspicious key;

updating the count of the number of times the rate is exceeded globally for the suspicious key;

determining whether one of the threshold values is crossed; and upon determining that one of the threshold values is crossed, assigning to the suspicious key the status associated with the threshold value that is crossed.

16. The method of claim 13, wherein the status assigned to the key indicates that the key is a suspicious key.

17. The method of claim 13 further comprising:

identifying suspicious keys; and sending an advertisement of suspicious keys to peer detection servers.

18. A detection server comprising:

a key store that identifies keys received at the detection server and information relating to the status of each key, each key being derived from an attribute of a message and the status of a key specifying whether or not the key is considered suspicious;

a host component that receives a request for a status of a specified key from a message delivery host, that updates the information of the key store for the specified key, that determines the status of the specified key from the information of the key store, and that sends the status of the specified key to the message delivery host; and a peer component that identifies keys of the key store with statuses that are considered suspicious, that sends advertisements of the identified keys to peer detection servers, that receives advertisements of suspicious keys from peer detection servers, and that updates the information of the key store based on the received advertisements of suspicious keys so that a detection server determines the status of a key based on an advertisement received from a peer detection server.

19. The server of claim 18, wherein the peer component also assigns statuses to keys based on advertisements received from peer detection servers.

20. The server of claim 18, wherein the host component also assigns statuses to keys based on requests for statuses of keys received from message delivery hosts.

\* \* \* \* \*